Figure 1:
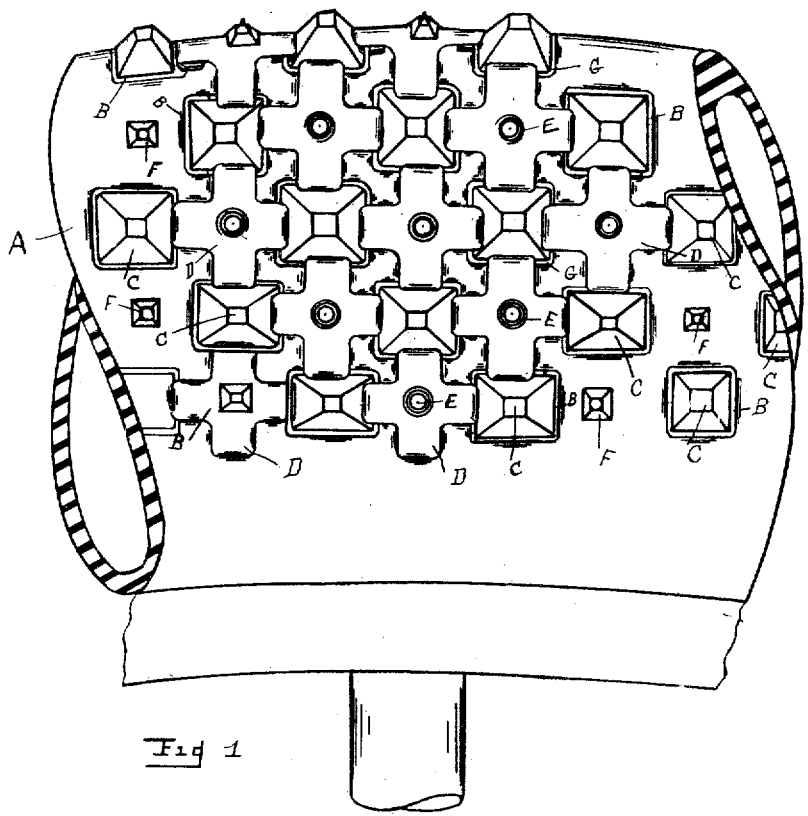

M. E. DAVIS.
TIRE.
APPLICATION FILED JUNE 9, 1910.

1,023,554.

Patented Apr. 16, 1912.

2 SHEETS—SHEET 1.

WITNESSES:

INVENTOR
MILTON E. DAVIS
BY
ATTORNEYS

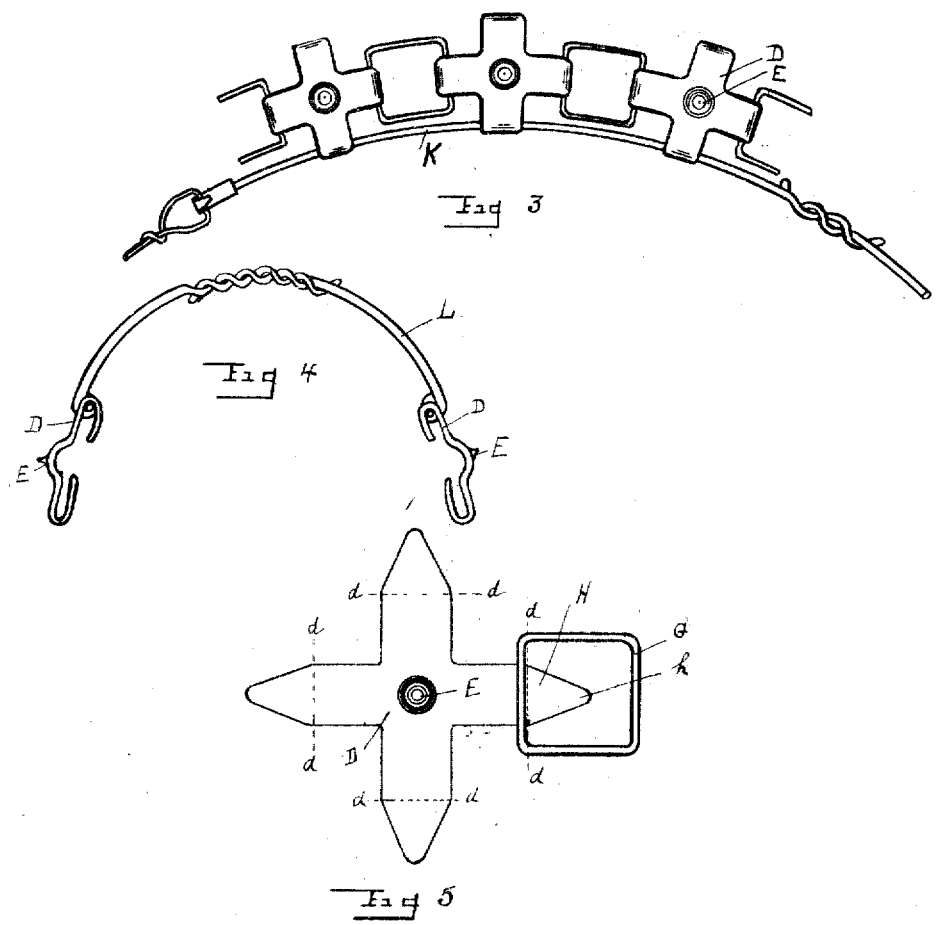

UNITED STATES PATENT OFFICE.

MILTON E. DAVIS, OF CANASTOTA, NEW YORK.

TIRE.

1,023,554.　　　Specification of Letters Patent.　　Patented Apr. 16, 1912.

Application filed June 9, 1910.　Serial No. 565,994.

*To all whom it may concern:*

Be it known that I, MILTON E. DAVIS, citizen of the United States, residing at Canastota, in the county of Madison and State of New York, have invented certain new and useful Improvements in Tires, of which the following is a specification, reference being had therein to the accompanying drawing.

My invention relates to an improved tire, and I declare that the following is a full, clear, concise and exact description thereof sufficient to enable one skilled in the art to make and use the same, reference being had to the accompanying drawings in which like reference characters refer to like parts throughout.

The invention is shown in one form as applied to an inflatable rubber tire of an automobile, and relates particularly to a shield to be used for the purpose of reducing wear on a tire.

Two forms of tire are shown as illustrative of the invention, and it will be understood that other forms of tire and of the shield itself may be used without departing from the spirit of the invention.

Figure 2:
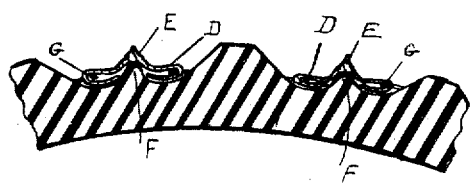

In the drawings, Figure 1 is a side view of a section of a tire, showing the tire as formed for the shield and portions of the shield thereon; Fig. 2 is a sectional longitudinal view of a portion of a tire, showing the rubber of the tire in section and portions of the shield; Fig. 3 shows a portion of the shield illustrated in Fig. 1, with a different method of securing the same onto the inflatable tube; Fig. 4 is a partial sectional view of a portion of the shield and different means of securing it onto the felly of the wheel; Fig. 5 is a plan view of one of the plates forming this kind of shield and of the links connecting the plates.

Referring to the figures in detail, A represents the tube of a tire or a solid rubber tire. This rubber tire is formed with certain depressions and protuberances, as indicated, the purpose being to hold or assist in holding the shield in place. The shield is formed to allow projections C of the tire through the openings in the shield and minor projections F into cavities in certain members of the shield. Certain depressions, at B, are made wherein will rest parts of the plates D and of links G of the shield. Nubs or protuberances C are formed in the tire, preferably of square pyramidal shape to fit through the links G of the shield which are preferably square. In the use of the wheel these projections C are naturally depressed so that the vehicle will ride upon the contracted nub C and upon the projecting portions of the plates and links so that the vehicle has the resiliency of the rubber and the grip or anti-skidding effect of the contact of the metal chain with the pavement, as well as the protection of the tire at most vulnerable points.

The chain, in the form shown in Fig. 1, consists partly of plates D. These are cut out of blanks, shown in Fig. 5, generally speaking in the form of a cross and of metal of a certain character and desired thickness. At the center there is an elevated boss E formed in the making of the plate and which is designed to project above the medial line of the surface of the tire, as indicated in Fig. 2. The rubber tire or tube is formed with corresponding projections or nubs F which reach up under the bosses E, as indicated in Fig. 2. The prongs of the blank are bent over, each to inclose a portion of the link G which is preferably substantially square, as seen in Fig. 5, the tip $h$ of the prong H extending into the recess formed by the concave wall of the boss E. In bending the arms of the plate, as on the lines $d$—$d$, the blank is not bent tightly but leaves an elongated space wherein the link G can slide to and from the center of the plate so that the shield can yield in different directions as the tire is compressed. It will be seen from Fig. 1 that the rings and plates in the outer circumference of the tire are largest, the size reducing as they near the felly.

The shield when of the form shown in Fig. 1 is to be placed over the tire when it is deflated and the plates which are nearest to the felly will be connected by their extended arms, the outer arms being omitted. If desired, however, the arms may be left on the plates and a wire or chain K may be passed around the wheel on each side of the felly and have its ends suitably connected, as by ordinary twisting of the ends or by a latch, as indicated in Fig. 3. It may be preferable, however, that the shield should be connected by some means passing over the felly, which may be represented by L in Fig. 4, connected at each end with one of the plates on each side of the wheel.

Having thus described my invention what I claim as new and desire to secure by Letters Patent is:

1. In a device of the character described, the combination of a tire having projections adapted to hold in place thereon a shield and said shield comprising plates with central projections and links to hold said plates together, the plates and links being adapted to receive the projections of the tire, substantially as described.

2. A tire having depressions and projections adapted to seat a shield and a shield composed of plates substantially cross shaped having central projections on one side receiving certain projections of the tire, and hooked prongs on the reverse side and links engaging the hooked prongs and receiving through them other projections of the tire whereby the projections hold the shield when the tire is inflated, substantially as described.

3. In a tire of the character described, the combination of a shield composed of plates having hooked prongs and portions oppositely disposed from said prongs, said plates held together by links engaging said hooked prongs and said chain held in assembled position upon said tire by the inflation thereof, the tire having depressions and projections to seat the plates and links of said chain guard, substantially as described.

4. The combination of a shield having plates each with a central interior recess, links connecting the plates in a loose engagement and a tire formed with nubs projecting through the links to an elevation to provide portions of the riding surface.

5. The combination with an inflatable tire, of a shield formed of plates and links connecting them in yielding engagement, the plates and rings decreasing in size from the outer circumference of the tire toward the smaller circumference on each side, the tire being formed with nubs to set through the links whereby the shield is held in place when the tire is inflated.

6. A tire shield formed of plates, substantially square links engaging the plates in elongated spaces therein, the tire being formed with pyramidal nubs fitting through the links and extending beyond the body of the shield.

7. The combination with a tire, of a shield made of plates with the center protruded and forming portions of the riding or tread surface and links connecting the plates, the tire having nubs projecting through the links and forming portions of the riding or tread surface.

8. A tire having, in combination with a tread portion, a metallic shield formed of links and curved plates, the plates having central projections, the tire having nubs some projecting through the links and some into the projecting portions of the plates whereby to support the plates to act as portions of the carrying surface, the link nubs also acting as portions of the carrying surface.

In testimony whereof I have hereunto affixed my signature in the presence of two witnesses.

MILTON E. DAVIS.

Witnesses:
   HENRY M. LOVE,
   T. L. WILDER.